Patented July 20, 1943

2,324,832

UNITED STATES PATENT OFFICE 2,324,832

PHOTOGRAPHIC EMULSION

Alfred Fröhlich and Wilhelm Schneider, Dessau, Germany, assignors to General Aniline & Film Corporation, New York, N. Y., a corporation of Delaware No Drawing. Application July 15, 1941, Serial No. 402,546. In Germany July 16, 1940

4 Claims. (Cl. 95—6)

Our present invention relates to photographic emulsions and more particularly to new silver halide emulsions for color forming development.

It is known to use aliphatic or aromatic amides of hydroxy acids capable of coupling as color formers for the blue in the production of color photographic images. Moreover, it has already been proposed to select suitable amines for amidating the acid group in order to influence the tint of the dyestuff. It is, therefore, possible to produce blue-green colors having a strongly green tint chiefly desired for the negative process or purely blue colors advantageous for the positive process, by means of suitable amines. However, not only is the tint of importance for the quality of the color images but the gradation thereof also is of significance. Thus it is, for instance, desirable for the negative process that color formers yielding a dyestuff image as "flat" as possible be available.

Our present invention is based on the observation that a blue-green dyestuff having a high permeability to green rays and a color image having a very flat gradation are obtained on the color development of silver halide emulsions which contain as the color former a condensation product from an aromatic hydroxy acid and an aromatic amine which is substituted in o- or p-position to the amino group by an amino group carrying a radicle producing fastness to diffusion and which is further substituted by an acid group in o- or p-position to the latter amino group.

The aromatic hydroxy acids capable of coupling, for instance, include the following compounds: α-hydroxynaphthoic acid, 1-hydroxynaphthalene-2-sulfonic acid, 1-hydroxynaphthalene-6-sulfonic acid, 1.2.3.4-xylenolcarboxylic acid, 5.6-dimethoxyphenol-2-carboxylic acid, 1-hydroxycarbazole-2-carboxylic acid, hydroxycinnamic acid, and 2.6-phenoldicarboxylic acid.

The hydroxy acids are condensed with o- or p-diamines one amino group of which contains a radicle producing fastness to diffusion as, for instance, described in the following patents and applications:

U. S. Patents 2,186,852, 2,186,719, 2,186,734, 2,186,851, 2,186,733, 2,186,732, 2,186,847 dated January 9, 1940, U. S. Patents 2,179,238, 2,179,244, 2,178,612 dated November 7, 1939, U. S. Patents Nos. 2,280,722 dated April 21, 1942, and 2,303,928 dated December 1, 1942, French Patents 344,648, 844,649, 844,637, and U. S. Patents 2,280,722, 292,575, 2,303,928 and 2,307,399 and U. S. applications Ser. No. 284,258 filed July 13, 1939, 333,814 filed May 7, 1940, 335,144 filed May 14, 1940, 341,180 filed June 18, 1940, and 362,592 filed October 24, 1940.

Amines suitable for preparing color formers of the present invention are, for instance, the following compounds: 1-amino-4-methyloctadecylaminobenzene-3-sulfonic acid, 1-amino-4-dodecylaminobenzene-3-carboxylic acid, 1-amino-4-abietinylaminobenzene-3-sulfonic acid, 1-amino-4-perhydrodiphenylaminobenzene-3-carboxylic acid, 1-amino-2-oleylaminobenzene-5-sulfonic acid, 1-amino-2-abietinylaminobenzene-5-carboxylic acid, 1-amino-2-methyloctadecylaminobenzene-3-carboxylic acid, or 1-amino-2-dodecylaminobenzene-3-sulfonic acid. These amines may be produced by boiling the corresponding nitrochlorosulfonic acids in the form of their sodium salts with the amines and then reducing the nitro group. The condensation with the hydroxy acids capable of coupling is conveniently carried out in the presence of an agent capable of combining with acids, the hydroxy acid being used in a reactive form, for instance, as an ester or acid chloride.

Color formers in accordance with the present invention are, for instance, the following condensation products: 1-hydroxy-2-naphthoylamino-4'-methyloctadecylaminobenzene-3'-sulfonic acid:

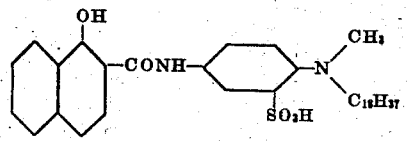

1.2.3.4-xylenolcarboylamino-4'-perhydrodiphenylaminobenzene-3'-carboxylic acid:

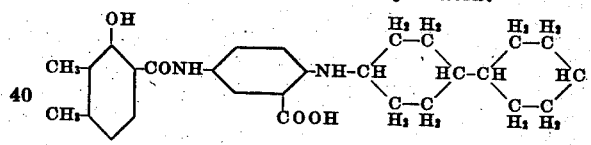

1-hydroxy-2-naphthoylamino-2'-methyloctadecylaminobenzene-5-sulfonic acid:

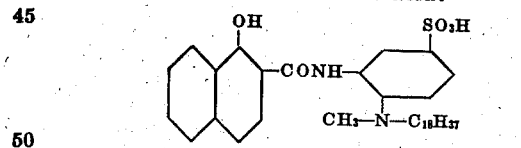

In these condensation products, if necessary, additional sulfo groups may be substituted for hydrogen atoms, preferably in the p-position of the hydroxy group by a subsequent treatment with concentrated sulfuric acid whereby the watersolubility of the sodium salts is increased. The color formers are added in the form of the sodium salts to the silver halide emulsions in any stage of the production thereof. On development with a color forming developer such as p-dimethylaminoaniline one obtains blue-green dyestuff images having a very flat gradation.

The silver halide gelatin emulsions prepared by the present color formers may be cast to form single layers or worked up into a multi-layer material for color photography by superimposing on each other, several silver halide emulsion layers containing different dyestuff formers on one or both sides of the support. If necessary, the multi-layer material may be provided with filter layers, intermediate layers, and anti-halation layers. The color images may be produced by a simple or a reversal development, i. e. as a negative or a positive, respectively.

We claim:

1. A color photographic silver-halide emulsion containing as the color former the compound of the following structural formula

RCONH—A wherein R is a hydroxy aryl radicle and A is an aryl radicle which is substituted by an amino group carrying a radicle capable of rendering said color former fast to diffusion, said amino group being in a position selected from the class consisting of the o- and p-positions relative to the amido linkage and by an acid group in a position selected from the class consisting of the o- and p-positions relative to the amino group carrying said radicle.

2. A color photographic silver-halide emulsion containing as the color former a compound corresponding with the following formula:

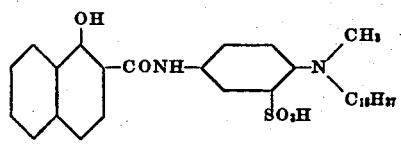

3. A color photographic silver-halide emulsion containing as the color former a compound corresponding with the following formula:

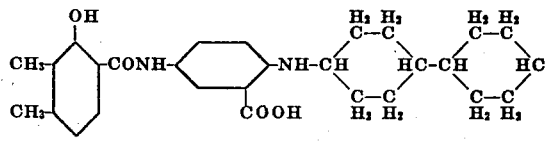

4. A color photographic silver-halide emulsion containing as the color former a compound corresponding with the following formula:

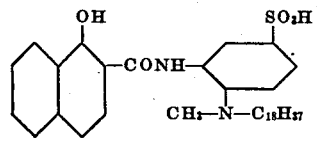

ALFRED FRÖHLICH.
WILHELM SCHNEIDER.